United States Patent [19]

Ueda et al.

[11] Patent Number: 5,767,935
[45] Date of Patent: Jun. 16, 1998

[54] LIGHT CONTROL SHEET AND LIQUID CRYSTAL DISPLAY DEVICE COMPRISING THE SAME

[75] Inventors: Kayoko Ueda; Masaru Honda; Yukio Yasunori, all of Osaka, Japan

[73] Assignee: Sumitomo Chemical Company, Limited, Osaka, Japan

[21] Appl. No.: 697,774

[22] Filed: Aug. 29, 1996

[30] Foreign Application Priority Data

Aug. 31, 1995 [JP] Japan .................. 7-224157

[51] Int. Cl.$^6$ .................. G02F 1/1335; G02B 5/02
[52] U.S. Cl. .................. 349/112; 359/599; 430/290
[58] Field of Search .................. 349/104, 112, 349/63, 64, 66; 359/599, 454; 430/4, 14, 20, 290; 362/355

[56] References Cited

U.S. PATENT DOCUMENTS

| 4,929,523 | 5/1990 | Kitayama et al. ............ 430/4 |
| 5,112,722 | 5/1992 | Tsujino et al. ............ 430/290 |
| 5,157,526 | 10/1992 | Kondo et al. ............ 349/63 |

FOREIGN PATENT DOCUMENTS

| 0 669 541 A1 | 8/1995 | European Pat. Off. . |
| 6-11606 | 1/1994 | Japan . |
| 7-146404 | 6/1995 | Japan . |
| 8-122757 | 5/1996 | Japan . |

OTHER PUBLICATIONS

M. Honda et al., "A Novel Polymer Film that Controls Light Transmission", pp. 159–169. No Date Provided.

*Primary Examiner*—William L. Sikes
*Assistant Examiner*—Tai V. Duong
*Attorney, Agent, or Firm*—Sughrue, Mion, Zinn, Macpeak & Seas, PLLC

[57] ABSTRACT

An optical filter for a liquid crystal display device, consisting of a polymer film which has two types of layers having different refractive index which exist alternately in a laminated state, in which a difference of refractive index between two types of layers is in the range between 0.01 and 0.1, an average thickness of each layer is at least 0.8 μm and less than 2 μm, and a thickness of the polymer film is in the range between 10 to 300 μm, which filter can widen an angle of view of the liquid crystal display is greatly without the improvement of the liquid crystal cell, change of an addressing system or modification of the liquid crystal itself.

12 Claims, 4 Drawing Sheets

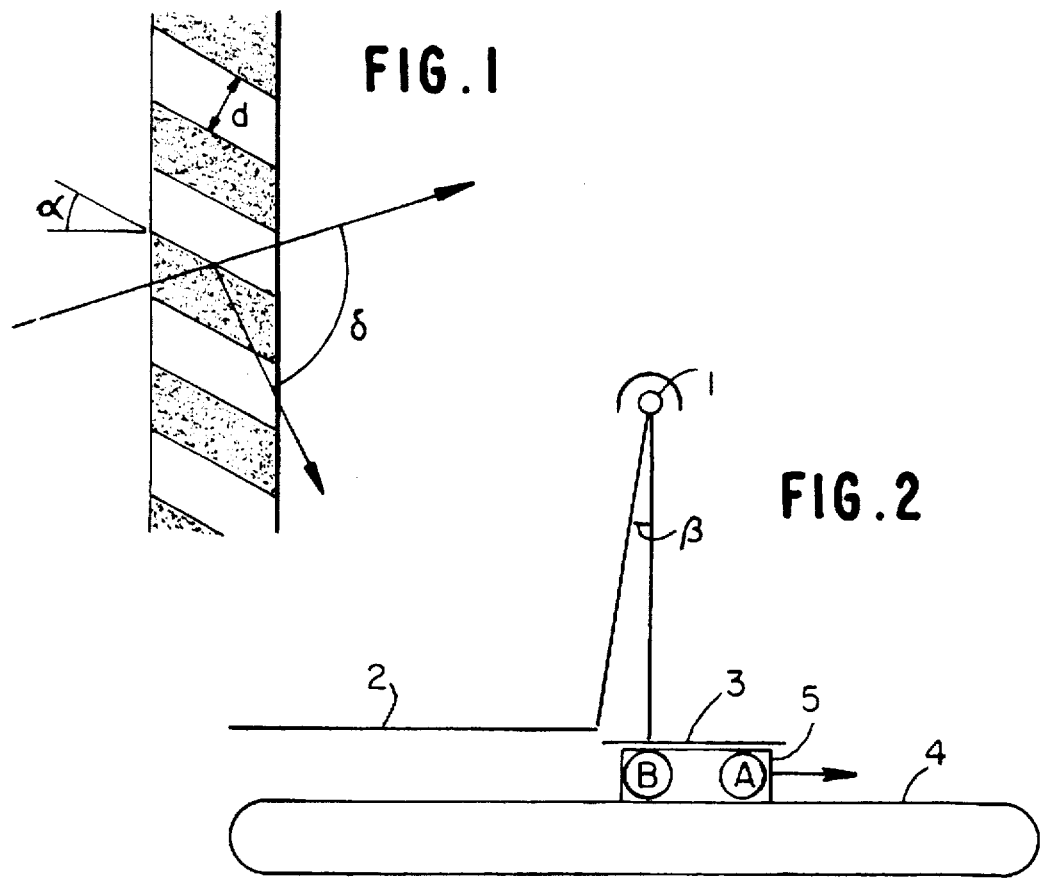
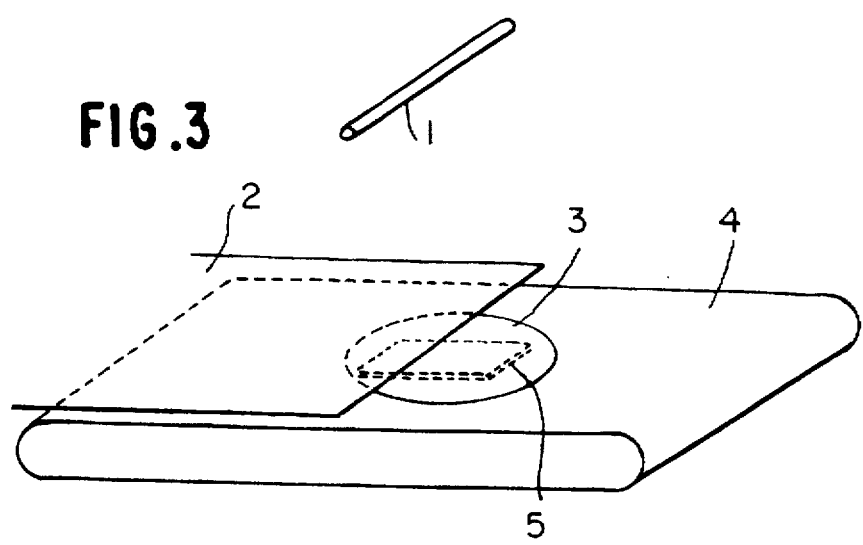

LIGHT CONTROL SHEET AND LIQUID CRYSTAL DISPLAY DEVICE COMPRISING THE SAME

BACKGROUND OF THE INVENTION

1. Field of the invention

The present invention relates to a filter for a liquid crystal display device, which will widen an angle of view when the filter is fitted to the liquid crystal display device such as a liquid crystal TV set, a liquid crystal display of a computer, and so on.

2. Description of conventional art

In these years, a liquid crystal display device is expected as a display device which can compete with a cathode ray tube (CRT), because of its characteristics such as its thinness, light weight and high picture quality. As addressing modes of the liquid crystal display device, there have been developed a TN type, a STN type, a ferroelectric type or a polymer dispersion type, and a liquid crystal display device with multicolor and high definition is commercially sold.

With the demand for a large area display and development of high-vision technique, an enlarging projection type display device is being spread.

Most of the liquid crystal display devices mainly use the TN or STN as the addressing mode. Such addressing mode has a drawback that an angle of view in which the image has satisfactory quality is narrow since, when a displayed image is viewed from an upper or lower angle and/or a right or left side angle, brightness and contrast of the image are considerably deteriorated.

As one of methods for the improvement of the above drawback, a method for correcting a pretilt angle of liquid crystal molecule using an orientation separating technique has been proposed. However, since this method makes the production step complicated and increases a production cost greatly, it have not been generally employed.

As a simple method, there is known a method for diffusing light in a wide angle range by the provision of a diffusing sheet comprising a transparent substrate and transparent fine particles which have a different refractive index from that of the substrate and are dispersed in the substrate or a lens sheet on a liquid crystal display panel. While the diffusing sheet can widen the angle of view, it greatly decreases the brightness. The lens sheet requires fine adjustment to make a picture clear.

SUMMARY OF THE INVENTION

An object of the present invention is to provide an optical filter which can widen an angle of view of a liquid crystal display device readily, and is produced easily and equipped to the liquid crystal display device.

Another object of the present invention is to provide a liquid crystal display device on which the above optical filter is fitted.

Accordingly, the present invention provides an optical filter for a liquid crystal display device, consisting of a polymer film which comprises two types of layers having different refractive index which exist alternately in a laminated state (which will be explained below), wherein a difference of refractive index between two types of layers is in the range between 0.01 and 0.1, an average thickness of each layer is at least 0.8 µm and less than 2 µm, and a thickness of the polymer film is in the range between 10 to 300 µm.

Further, the present invention provides a liquid crystal display device comprising a light source member, a back polarization plate, a liquid crystal cell plate, a front polarization plate and the above filter of the present invention which is provided in front of the liquid crystal cell plate.

BRIEF DESCRIPTION OF THE DRAWINGS

FIG. 1 schematically shows a layer structure of the polymer film according to the present invention, and light transmission characteristics.

FIG. 2 is a side view of an apparatus for irradiating UV light on the polymer film.

FIG. 3 is a perspective view of an apparatus for irradiating UV light on the polymer film.

DETAILED DESCRIPTION OF THE INVENTION

Figure 4:
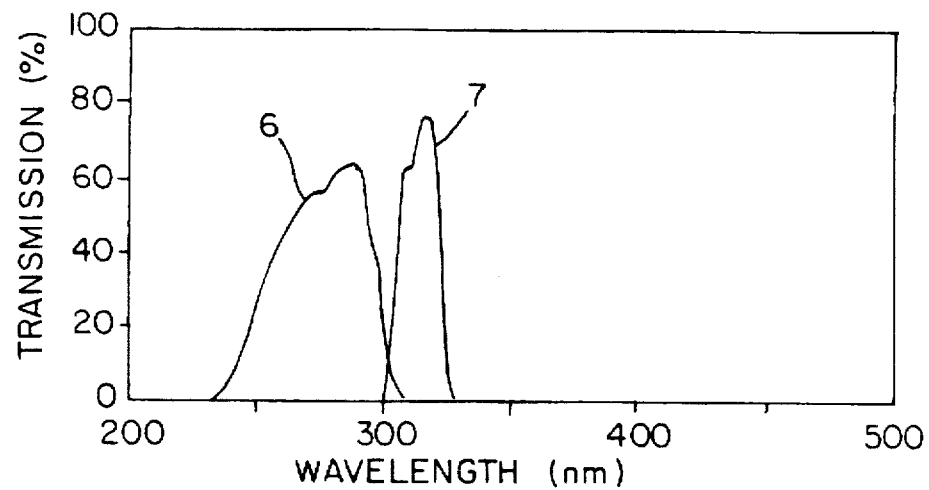
FIG. 4 is a transmission spectrum of a interference filter used in the Examples.

In the filter of the present invention, the two types of layers exist alternately in a laminated state, in other words, in a blind state. That is, the two types of layers exist so that an angle between an interface of the layers and the normal line to the polymer film surface is in the range between +70 degrees and −70 degrees. An example of the layers which exist in the laminated state is shown in FIG. 1.

In FIG. 1, an angle between the interface of the layers and the normal line to the polymer film surface is represented by α, and the angle α is from +70 degrees to −70 degrees from the normal line. Incident light from the left side of the polymer film is diffused in a range having an angle δ. The degree of angle δ depends on the angle α.

In FIG. 1, the liquid crystal cell plate is present on the left side of the polymer film, while eyes are on the right side of the polymer film. Since a range of angle δ is determined according to the range of the angle of view which is required for the specific liquid crystal display device, the angle α is selected depending on the angle δ.

An average thickness (d) of each layer is at least 0.8 µm and less than 2 µm, preferably between 0.8 µm and 1.99 µm.

The average thickness (d) of each layer is calculated as follows:

Light having the single wavelength of 1000 nm is impinged on the polymer film at various angles, and an angular distribution of diffused light intensities of outgoing light is measured at each incident angle.

Among the distributions of the diffused light intensities, the distribution at the incident angle at which a peak of the diffused light intensity of the outgoing light is maximum is selected, and an angle (2θ) between the incident light direction and the direction in which the peak of the diffused light intensity is present is measured, whereby the angle θ is obtained.

An average refractive index of the two types of layers, the light wavelength, and the angle θ are substituted in the Bragg condition equation:

$$\lambda = 2dn\sin\theta$$

wherein n is the average refractive index of the two types of layers, λ is the wavelength (1000 nm), and d is an average thickness of the specific layer.

The difference of refractive index between the two types of layers is between 0.01 and 0.1. When the difference is less than 0.01, the optical filter does not provide a sufficient angle of view. An absolute value of the refractive index of each layer is not limited insofar as the difference is within the above range.

The difference of refractive index between the two types of layers can be measured as follows:

With a sample of the polymer film having a thickness of about 10 μm, measurement is performed using an interference phase-contrast microscope (INTER-FACO manufactured by JENA, Germany). First, an optical phase constant value in an air of the layer having the higher refractive index is measured in an air. Then, a phase contrast value in water of the same part is measured. From these values, a refractive index ($n_{OH}$) of the layer having the higher refractive index is calculated according to the following equations (1) and (2). Next, by the same method, a refractive index ($n_{OL}$) of thelayer having the lower refractive index is calculated according to the following equations (3) and (4). Finally, a refractive index difference ($n_{HL}$) is calculated according to the following equation (5).

(1) $R_{1H}/R_{2H} = (n_{OH} - n_1)/(n_{OH} - n_2)$ (2) $n_{OH} = (R_{2H}n_{1-R1H}n_2)/(R_{2H} - R_{1H})$ (3) $R_{1L}/R_{2L} = (n_{OL} - n_{1y(nOL} - n_2)$ (4) $n_{OL} = (R_{2L}n_{1-R1L}n_2)/(R_{2L} - R_{1L})$ (5) $n_{HL} = n_{OH} - n_{OL}$ wherein $n_{OH}$ is a refractive index of the layer having the higher refractive index, $n_{OL}$ is a refractive index of the layer having the lower refractive index, $n_{HL}$ is a refractive index difference between the two types of layers, $R_{1H}$ is a phase contrast value in the air of the layer having the higher refractive index, $R_{2H}$ is a phase contrast value in water of the layer having the higher refractive index, $R_{2H}$ is a phase contrast value in the air of the layer having the lower refractive index, $R_{2L}$ is a phase contrast value in water of the layer having the lower refractive index, $n_1$ is a refractive index of the air (1.00), and $n_2$ is a refractive index of water (1.33).

A thickness of polymer film is between 10 and 300 μm. When the thickness of polymer film is less than 10 μm, the optical filter does not provide a sufficient angle of view. When the thickness exceeds 300 μm, the angle of view does not increase further.

To produce the optical filter of the present invention, the method described in JP-A-6-11606 can be used.

That is, a film form body of a composition comprising at least two photopolymerizable compounds having different refractive indices is irradiated with UV light having a wavelength of 400 nm or less from a specific direction to polymerize and cure the composition.

Examples of the photopolymerizable compositions are those used for producing a light regulating plate, which are described in JP-A-3-107901 and U.S. Pat. Nos. 4,929,523 and 5,112,722. The disclosures of these U.S. Pat. Nos. are hereby incorporated by reference.

A specific example of the composition is a composition comprising at least two of monomers (A) and/or oligomers (B) having a photopolymerizable double bond and different refractive indices. Among the combinations of the monomers (A) and/or oligomers (B), a combination having the refractive index difference of between 0.01 and 0.1 is preferably used.

Specific examples of the monomer (A) are tetrahydrofurfuryl acrylate, ethylcarbitol acrylate, dicyclopentenyloxyethyl acrylate, phenylcarbitol acrylate, nonylphenoxyethyl acrylate, 2-hydroxy-3-phenoxypropyl acrylate, ω-hydroxyhexanoyloxyethyl acrylate, acryloyloxyethyl succinate, acryloyloxyethyl phthalate, tribromophenoxyethyl acrylate, isobornyl acrylate, 2-ethylhexyl acrylate, lauryl acrylate, 2,2,3,3-tetrafluoropropyl acrylate, phenoxyethyl acrylate, and methacrylates corresponding to those acrylates, N-vinylpyrrolidone, N-acryloylmorpholine, and so on. They may be used independently or in admixture of two or more of them.

Specific examples of the oligomer (B) are polyol polyacrylate, modified polyol polyacrylate, polyacrylate comprising a isocyanuric acid backbone, melamine acrylate, polyacrylate having a hydantoin backbone, polybutadiene acrylate, epoxy acrylate, urethane acrylate, and so on. These oligomers may be used independently or in admixture of two or more of them.

Examples of the photopolymerizable composition comprising at least two of the monomers (A) and/or oligomers (B) are a composition of at least two monomers (A), a composition of at least two oligomers (B), and a composition of at least one monomer (A) and at least one oligomer (B). Among them, the composition of at least one monomer (A) and at least one oligomer (B) is preferred.

Specific examples of the combinations of the monomers (A) and/or oligomers (B) are a monomer containing tribromophenoxy acrylate and polyetherurethane acrylate; a monomer containing 2-hydroxy-3-phenoxypropyl acrylate and polyetherurethane acrylate; a monomer containing phenoxyethyl acrylate and polyetherurethane acrylate; and so on.

In the composition of at least two photopolymerizable monomers and/or oligomers, a weight ratio of a compound having a higher refractive index of, for example 1.5 or larger to a compound having a lower refractive index of, for example, less than 1.5 is preferably between 9:1 and 1:9, more preferably between 8:2 and 2:8.

A specific examples of such composition are a composition comprising 2,4,6-tribromophenoxy acrylate and 2-hydroxy-3-phenoxypropyl acrylate (both compounds having a higher refractive index) and a urethaneacrylate oligomer (a compound having a lower refractive index) in a weight ratio of about 3:3:4, and a composition comprising 2,4,6-tribromophenoxy acrylate and 2-phenoxyethyl acrylate (both compounds having a higher refractive index) and a urethaneacrylate oligomer (a compound having a lower refractive index) in a weight ratio of about 3:3:4.

A composition comprising the photopolymerizable monomers and/or oligomers according to the present invention preferably contains a conventional photopolymerization initiator to accelerate a photo-crosslinking reaction. Examples of the photopolymerization initiator are benzophenone, benzil, Michler's ketones, 2-chlorothioxanthone, 2,4-diethylthioxanthone, benzoin ethyl ether, diethoxyacetophenone, benzyldimethylketal, 2-hydroxy-2-methylpropiophenone, 1-hydroxycyclohexyl phenyl ketone, and so on.

To the photopolymerizable composition according to the present invention, a filler having an average particle size of 0.05 to 20 μm may be added in an amount of 0.01 to 5 parts by weight, or a UV light absorber may be added.

As the filler, polymethyl methacrylate, polyethylene, polystyrene and silica are exemplified.

In the present invention, the photopolymerizable composition according to the present invention is formed in a film-form by, for example, coating the composition on a substrate or filling it in a cell. Then, the UV light is irradiated on the film-form composition to obtain the polymer film. In this step, a thickness of the photopolymerizable composition is substantially the same as that of the polymer film.

As a light source to be used in the photopolymerization, there is used a light source having a linear shape viewed from the substrate to be irradiated (a film plane). One of the preferred linear shape light sources is a rod-shape light source. When the linear shape light source is used and irradiation conditions are adjusted properly, the obtained photopolymerized film has anisotropies in directions corresponding to the longer and shorter axes of the light source, so that the polymer film has the angular dependency of the light diffusing performance only when it is rotated around the longer axis of the light source.

That is, during the irradiation of the UV light from a fixed angle direction, the monomers and/or oligomers are photopolymerized and cured with phase separation, whereby, in the formed polymer film, the two types of layers having the different refractive indices exist alternately in the laminated state substantially in parallel with the longer axis of the linear light source and also with the direction of the UV light irradiation from the light source.

More concretely, the polymer film comprising the two types of layers having the different refractive indices which exist alternately in the laminated state can be produced as follows (see FIGS. 2 and 3):

A light-shielding plate 2 is fixed at a position at which a direction from the light source 1 to a front edge of the light-shielding plate 2 and a normal line direction to the film form body 5 of the photopolymerizable composition (a direction perpendicular to the film form body plane) form an angle of β (see FIG. 2) At the initial step, the film form body 5 of the photopolymerizable composition and an interference filter 3 are placed below the light-shielding plate 2 so that they are not irradiated by the UV light. Then, the film form body 5 and the filter 3 are moved in the direction indicated by the arrow at a constant rate. By such movement, a part of the film form body which exits the front edge of the light-shielding plate 2 is irradiated from one angle direction by the UV light from the light source 1 and cured. Finally, the polymer film in which the two types of layers having the different refractive indices exist alternately in the laminated state at the angel β from the normal line to the film plane is formed.

The above method can easily produce the filter comprising a refractive index modulating type smooth light diffusing plate in which each thickness of the two types of layers is at least 0.8 μm and less than 2 μm without the use of a special mask in the UV light irradiation step.

By the selection of the UV light wavelength, the thicknesses of the two types of layers having the different refractive indices can be adjusted. As the wavelength of the irradiation light is shorter, the average thicknesses (d) of the two types of the layers are smaller.

When the UV light to be irradiated has the wavelength of 400 nm or shorter, the average thickness of each layer can be made at least 0.8 μm and less than 2 μm.

To irradiate the UV light having the wavelength of 400 nm or shorter, there is used a light source which generates UV light having mainly wavelength of 400 nm or shorter such as a low pressure mercury lamp and an excimer laser.

Alternatively, a filter (for example, interference filter) which cuts light having wavelength exceeding 400 nm is placed between a light source such as a high pressure mercury lamp and photopolymerizable composition.

In general, the high pressure mercury lamp is used as the light source, and the filter which cuts the light having the wavelength exceeding 400 nm is used in combination.

The polymer film of the present invention as such may be used as the optical filter. When it is used as the optical filter to be fitted on the liquid crystal display face plane, a transparent substrate is preferably laminated on an outer surface of the polymer film for surface protection.

Any transparent substrate can be used insofar as it is transparent. Examples of a material of the transparent substrate are polycarbonate resins, methacrylate resins, polyethylene terephthalate (PET) resins, polystyrene resins, and transparent glass.

Preferably, an outer surface of the transparent substrate is subjected to at least one treatment selected from low reflection treatment, glare proofing treatment and hard coat treatment.

A method of adhering the polymer film to the transparent substrate is not limited, and any of conventional methods may be used.

If desired, plural polymer films of the present invention are used in one filter.

In the present invention, the liquid crystal display with which the optical filter is used comprises a light source member, a back polarization plate, a liquid crystal cell plate and a front polarization plate.

There are various types of the liquid crystal device according to the mechanisms of the liquid crystal cell plate. In any case, the liquid crystal device comprises the light source member, the back polarization plate, the liquid crystal cell plate and the front polarization plate which are provided in this order. If necessary, the liquid crystal device may comprise an optical compensation plate, a color filter or other element between the above essential elements or in front of or behind one or more of the above essential elements.

The above elements of the liquid crystal display may be conventional ones.

The liquid crystal device has two polarization plates. In this specification, one between the light source member and the liquid crystal cell plate is called as the back polarization plate, while one in front of the liquid crystal cell plate is called as the front polarization plate.

The optical filter of the present invention has functions to diffuse the light which is emitted from the liquid crystal cell plate in the direction in which good displaying characteristics are exhibited in upper and lower directions and/or right and left side directions.

Then, the optical filter of the present invention widen the angle of view of the liquid crystal device.

In use, the optical fiber of the present invention is placed on the viewing side, that is, the front side of the liquid crystal cell plate.

For example, the optical filter is present between the liquid crystal cell plate and the front polarization plate, or in front of the front polarization plate.

In some cases, the liquid crystal device has the optical compensation plate or the color filter in front of the liquid crystal cell plate. When the color filter is used, the optical filter is present on the front side of the color filter. When the optical compensation plate is used, the optical filter may be present either on the back or front side of the optical compensation plate.

Examples

The present invention will be illustrated by the following Examples, which do not limit the scope of the present invention in any way.

In the Examples, the property measurements are as follows:

(1) Measurement of angle of view (No. 1)

Figure 8:
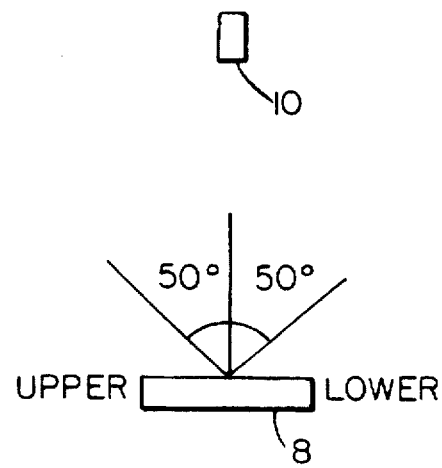
FIG. 8 illustrates a method for measuring an angle of view (No. 1) in the Examples.

As a liquid crystal display unit, a TN type liquid crystal color TV set 4E-L1 (manufactured by Sharp Corporation) was used. Using a digital color pattern generator MTSG-1000 (manufactured by SONY Corporation), a whole white pattern or a whole black pattern was projected on the liquid crystal color TV screen. Then, a white luminance on the whole white pattern and a black luminance on the whole black pattern were measured with a photometer 10 (LS-100 manufactured by MINOLTA Co., Ltd.) from 50 degrees in the upper side of the screen to 50 degrees in the lower side of the screen 8 as shown in FIG. 8. Then, a ratio of the white luminance to the black luminance was calculated as a contrast ratio. An angle range in which the contrast ratio was 5 or larger was recorded as an angle of view in each of the upper and lower sides.

(2) Measurement of angle of view (No. 2)

Figure 9:
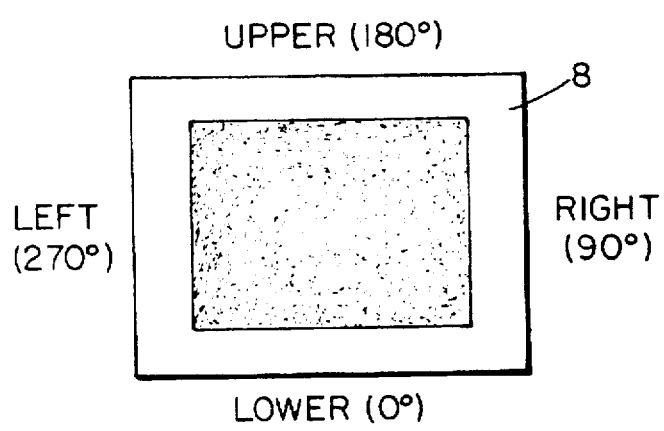
FIG. 9 and 10 illustrate a method for measuring an angle of view (No. 2) in the Examples.
Figure 10:
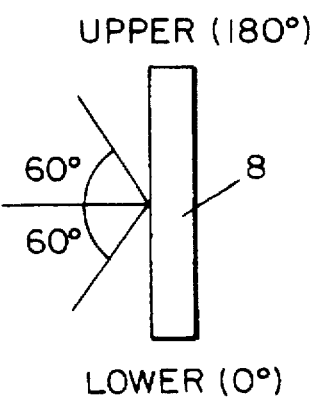
Figure 11:
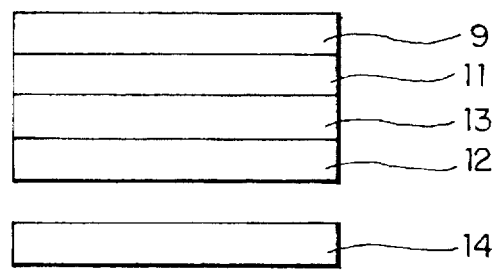
FIGS. 11 and 12 show different arrangements of the light control film in a liquid crystal display device.
Figure 12:

As a liquid crystal display unit, a TN type liquid crystal color TV set 4E-L1 (manufactured by Sharp Corporation) was used. A contrast ratio when white/black pattern was displayed and gray scale inversion at eight gray levels were measured with LCD-7000 (manufactured by Otsuka Electronic Co., Ltd.) from 60 degrees in the upper side of the screen 8 to 60 degree in the lower side of the screen 8 as shown in FIG. 9. An angle range at which the contrast ratio was 5 or larger, or the gray scale inversion started was recorded as an angle of view.

(3) Angular distribution of diffused light intensity

From the back side of the sample (i.e. the reverse side to the UV light irradiated side), monochromatic light was injected and an angular distribution of outgoing diffused light was measured with a diffused light intensity meter MPC-3100 (manufactured by Shimadzu Corporation). An angle of the incident light injected to the sample was selected so that the diffused light intensity corresponding to the Bragg diffraction was largest.

(4) Haze

According to JIS K 7105, a haze was measured with HAZE GUARD PLUS (manufactured by BIG CHEMIE).

Comparative Example 1

With the TN type liquid crystal color TV set 4E-L1 (manufactured by Sharp Corporation) having no optical filter, the white luminance and black luminance were measured, and the contrast ratio and angles of view were recorded. The results are shown in Table 1.

Comparative Example 2

With the TN type liquid crystal color TV set 4E-L1 (manufactured by Sharp Corporation) having no optical filter, the contrast ratio when white/black pattern was displayed and gray scale inversion at eight gray scale were measured, and angles of view were recorded. The results are shown in Table 2.

Example 1

To provide a photopolymerizable composition comprising at least two compounds having different refractive indices which differ by 0.01 or more, there were mixed 40 phr of polyetherurethane acrylate having a weight average molecular weight of about 6000 which had been prepared by reacting hexamethylene diisocyanate and 2-hydroxyethyl acrylate with polypropylene glycol, 30 phr of 2,4,6-tribromophenyl acrylate, 30 phr of 2-hydroxy-3-phenoxypropyl acrylate and 1.5 phr of 2-hydroxy-2-methylpropiophenone as a photopolymerization initiator.

The composition was coated on a PET film having a thickness of 188 µm to a thickness of 150 µm.

To cure the coated composition, the UV light irradiating apparatus shown in FIGS. 2 and 3 having a mercury lamp 1 (80 W/cm) was used. A shielding plate 2 was set so that a conveyer 4 was irradiated from a position right under the lamp 1. In this case, an angle β between the vertical line from the lamp 1 to the conveyer 4 and the line connecting the lamp 1 and the front edge of the shielding plate 2 was defined as a UV light irradiating angle.

On the conveyer 4, the PET film 5 carrying the coated composition was placed. Over the composition, an interference filter 3 having the transmitting wavelength of 254 nm was placed. A transmission spectrum of the used interference filter is shown in FIG. 4.

The conveyer 4 was traveled at a rate of 0.2 m/min., and the UV light from the lamp 1 was irradiated on the coated composition carried on the PET film 5 through the interference filter 3 at the UV light irradiating angle β of 5.5° to photopolymerize the composition. By this method, the PET film 5 carrying the cured film was obtained.

Figure 5:
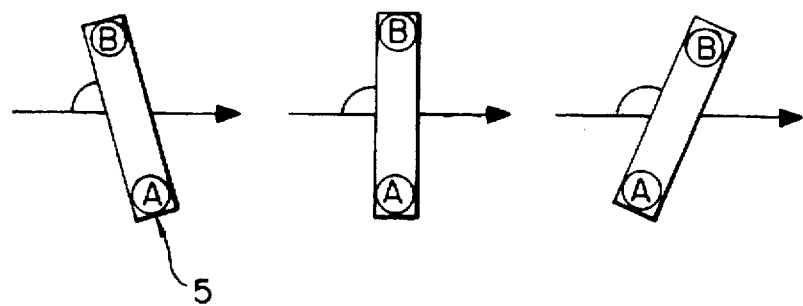
FIG. 5 shows a method for measuring dependency of haze of a filter on an incident angle of light.

With the PET film 5 carrying the cured film, dependency of the haze on an incident angle of the light was measured by a method illustrated in FIG. 5. The opaque angle range in which the haze was 60% or more is shown in Table 3.

The cured film was peeled off from the PET film and used as an optical filter.

From the angular distribution of diffused light intensity, average thicknesses of the two types of layers were measured by the above described method, and they were 1.1 µm.

Figure 6:
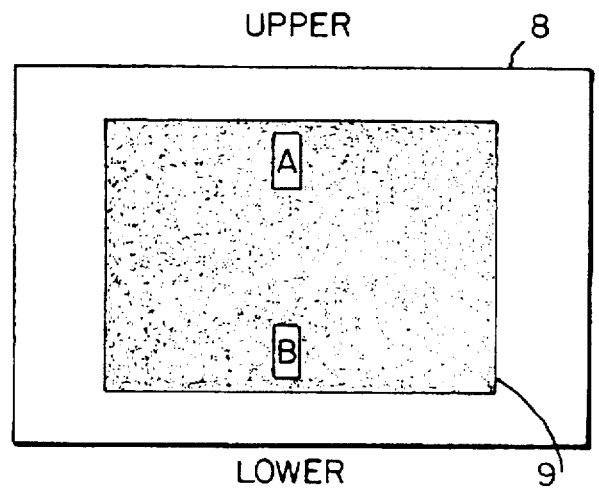
FIGS. 6 and 7 are a front view and side view of a liquid crystal TV set on which the optical filter is fitted, respectively.
Figure 7:
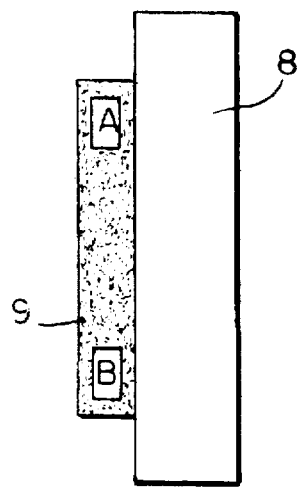

As shown in FIGS. 6 and 7, the obtained optical filter 9 was attached on the display face of the liquid crystal TV set, and the same measurements as those in Comparative Example 1 were performed. The results are shown in Table 1.

Comparative Example 3

Under the same condition as in Example 1 except that no interference filter was used, a cured film was produced and used as an optical filter.

The opaque angle range in which the haze was 60% or more is shown in Table 3.

The average thicknesses of the two types of layers were 2.0 µm.

Using this optical filter, the same measurements as those in Example 1 were performed. The results are shown in Table 1.

Example 2

In the same manner as in Example 1 except that the composition prepared in Example 1 was coated on the PET film to a thickness of 300 µm, an interference filter having the transmitting wavelength of 313 nm was used, the conveyer was traveled at a rate or 0.4 m/min., and the UV light irradiating angle was 17°, the cured film was prepared.

The opaque angle range in which the haze was 60% or more is shown in Table 3.

The average thicknesses of the two types of layers were 1.9 µm.

Using this optical filter, the same measurements as those in Example 1 were performed. The results are shown in Table 1.

Comparative Example 4

Under the same condition as in Example 2 except that no interference filter was used, a cured film was produced and used as an optical filter.

The opaque angle range in which the haze was 60% or more is shown in Table 3.

The average thicknesses of the two types of layers were 2.1 μm.

Using this optical filter, the same measurements as those in Example 1 were performed. The results are shown in Table 1.

Example 3

In the same manner as in Example 1 except that 0.01 phr of fine particles of polymethyl methacrylate having an average particle size of 0.1 μm (MP-300 manufactured by SOKEN CHEMICAL KABUSHIKIKAISHA) was additionally used, a photopolymerizable composition was prepared.

In the same method as in Example 1 except that the above prepared composition was coated on the PET film to a thickness of 205 μm, an interference filter having the transmitting wavelength of 313 nm was used, the conveyer was traveled at a rate or 0.5 m/min., and the UV light irradiating angle was 20°, the cured film was prepared.

The opaque angle range in which the haze was 60% or more is shown in Table 3.

The average thicknesses of the two types of layers were 1.5 μm.

Using this cured film as an optical filter, the same measurements as those in Comparative Example 2 were performed. The results are shown in Table 2.

Example 4

In the same method as in Example 1 except that the composition prepared in Example 3 was coated on the PET film to a thickness of 195 μm, an interference filter having the transmitting wavelength of 313 nm was used, the conveyer was traveled at a rate or 0.6 m/min., and the UV light irradiating angle was 0°, the cured film was prepared.

The average thicknesses of the two types of layers were 1.4 μm.

Using this cured film as an optical filter, the same measurements as those in Comparative Example 2 were performed. The results are shown in Table 2.

TABLE 1

| Example No. | Angle of view (No. 1) | | |
|---|---|---|---|
| | Upper direction | Lower direction | Range of angle of view |
| Example 1 | 45° | 30° | 75° |
| Example 2 | 45° | 25° | 70° |
| Comp. Ex. 1 | 20° | 30° | 50° |
| Comp. Ex. 3 | 30° | 30° | 60° |
| Comp. Ex. 4 | 40° | 25° | 65° |

TABLE 2

| Example No. | Angle of view (No. 2) | | | |
|---|---|---|---|---|
| | Contrast ratio ≥ 5 | | Gray scale inversion | |
| | Upper direction | Lower direction | Upper direction | Lower direction |
| Example 3 | 59° | 29° | >60° | 40° |
| Example 4 | 45° | 30° | 55° | 55° |
| Comp. Ex. 2 | 30° | 29° | 15° | 30° |

TABLE 3

| Example No. | Opaque angle range (degrees) |
|---|---|
| Example 1 | 65 |
| Example 2 | 39 |
| Example 3 | >50 |
| Example 4 | 57 |
| Comp. Ex. 3 | 26 |
| Comp. Ex. 4 | 27 |

Effects of the invention

When the optical filter of the present invention is used, the angle of view of the liquid crystal display is easily widened greatly without the improvement of the conventional liquid crystal cell, change of the addressing system or modification of the liquid crystal itself.

What is claimed is:

1. A light control sheet or film for a liquid crystal display device, consisting of a polymer film which comprises two types of layers having different refractive indices which exist alternately in a laminated state, wherein the difference between the refractive indices of the two types of layers is between 0.01 and 0.1, each layer having an average thickness of at least 0.8 μm and less than 2 μm, and the polymer film having a thickness of 10 to 300 μm.

2. The light control sheet or film according to claim 1, wherein said average thickness of each layer is between 0.8 and 1.99 μm.

3. The light control sheet or film according to claim 1, wherein said polymer film is obtained by irradiating a film form body of a composition comprising at least two photopolymerizable compounds having different refractive indices which differ by 0.01 to 0.1 with UV light having a wavelength of 400 nm or less from one direction.

4. The light control sheet or film according to claim 3, wherein said composition comprises at least two compounds selected from the group consisting of monomers and oligomers each having a photopolymerizable double bond.

5. The light control sheet or film according to claim 4, wherein said composition comprises at least one monomer having a photopolymerizable double bond and at least one oligomer having a photopolymerizable double bond.

6. The light control sheet or film according to claim 5, wherein said monomer having a photopolymerizable double bond is a (meth)acrylate monomer, and said oligomer having a photopolymerizable double bond is a (meth)acrylate oligomer.

7. The light control sheet or film according to claim 6, wherein said (meth)acrylate monomer is at least one monomer selected from the group consisting of tetrahydrofurfuryl acrylate, ethylcarbitol acrylate, dicyclopentenyloxyethyl acrylate, phenylcarbitol acrylate, nonylphenoxyethyl acrylate, 2-hydroxy-3-phenoxypropyl acrylate, ω-hydroxyhexanoyloxyethyl acrylate, acryloyloxyethyl succinate, acryloyloxyethyl phthalate, tribromophenoxyethyl acrylate, isobornyl acrylate, 2-ethylhexyl acrylate, lauryl acrylate, 2,2,3,3-tetrafluoropropyl acrylate, phenoxyethyl acrylate, and methacrylates corresponding to those acrylates, N-vinylpyrrolidone and Nacryloylmorpholine.

8. The light control sheet or film according to claim 6, wherein said oligomer is at least one oligomer selected from the group consisting of polyol polyacrylate, modified polyol polyacrylate, polyacrylate comprising a isocyanuric acid backbone, melamine acrylate, polyacrylate having a hydantoin backbone, polybutadiene acrylate, epoxy acrylate and urethane acrylate.

9. A liquid crystal display device comprising a light source member, a back polarization plate, a liquid crystal cell plate, a front polarization plate and a light control sheet or film as claimed in claim 1 which is provided in front of the liquid crystal cell plate.

10. The liquid crystal display device according to claim 9, wherein said light control sheet or film is provided between the liquid crystal cell plate and the front polarization plate, or in front of the front polarization plate.

11. A method for enlarging an angle of view of a liquid crystal display device which comprises a light source member, a back polarization plate, a liquid crystal cell plate and a front polarization plate, comprising providing a light control sheet or film as claimed in claim 1 in front of the liquid crystal cell plate.

12. The method according to claim 11, wherein said light control sheet or film is provided between the liquid crystal cell plate and the front polarization plate, or in front of the front polarization plate.

* * * * *